Jan. 3, 1967 D. B. FRASER ET AL 3,296,555

TEMPERATURE-STABLE SONIC TRANSMISSION ELEMENTS COMPRISING CRYSTALLINE MATERIALS CONTAINING JAHN-TELLER IONS

Filed Oct. 8, 1964 2 Sheets-Sheet 1

INVENTORS: D. B. FRASER
E. M. GYORGY
R. C. LECRAW
F. J. SCHNETTLER

BY George S. Indig

ATTORNEY

United States Patent Office 3,296,555
Patented Jan. 3, 1967

3,296,555
TEMPERATURE-STABLE SONIC TRANSMISSION ELEMENTS COMPRISING CRYSTALLINE MATERIALS CONTAINING JAHN-TELLER IONS

David B. Fraser, Berkeley Heights, Ernst M. Gyorgy, Morris Plains, Roy C. Le Craw, Madison, and Frank J. Schnettler, Morristown, N.J., assignors to Bell Telephone Laboratories, Incorporated, New York, N.Y., a corporation of New York Filed Oct. 8, 1964, Ser. No. 402,453
9 Claims. (Cl. 331—157)

This invention relates to materials manifesting temperature-stable elastic wave velocities and to devices containing such materials.

It is unnecessary to outline in detail the increasingly important role played by elastic wave devices in modern technology. They serve in many forms, including electromagnetic wave generators which may be used as frequency standards, as delay lines, including those of a dispersive nature, as elastic wave generators and receivers in sonar systems, phonograph pickups, etc., as modulators for electromagnetic energy including light, and in high frequency ultrasonic systems.

From the technological standpoint, one of the more important uses for such elements derives from their frequency stabilizing ability. In this use, materials having good acoustic qualities are cut to such a size as to efficiently support only a very narrow range of sonic frequencies. Some such devices utilize separate transducers for conversion between electromagnetic and elastic wave energy; others may depend upon the piezoelectric, magnetic, or other nature of the acoustic element itself.

At this time, the most precise frequency-stabilizing devices utilize quartz as the stabilizing element. While quartz, like other suitable acoustic materials, is known to have a temperature-dependent elastic wave propagation velocity, exhaustive work carried out by W. P. Mason has resulted in what is now the universal technique for minimizing the effect of this relationship. The principle used takes advantage of the fact that the temperature coefficient of elastic wave velocity in quartz is of different sign in different crystallographic directions. Stable crystals result from precise crystal cuts that result in a compensation of a positive coefficient by a negative. A plot of velocity against temperature for such a cut crystal reveals a "turnover" point, that is, a temperature at which the change in velocity changes direction. Relative temperature insensitivity makes use of the flat portion of the characteristic at this turnover point.

The technological importance of quartz crystals so cut and polished as to have a turnover point over an appropriate temperature range is undeniable. This material is an excellent elastic wave transmission medium. Further, natural deposits of high quality quartz are abundant, and even this material has, in many applications, been largely supplanted by artificially grown crystals produced by carefully controled hydrothermal processing.

Nevertheless, there is little doubt but that many device requirements for temperature-stable elastic wave operation remain unsatisfied. In these uses, quartz is not suitably incorporated by reason of expense, the difficulty of obtaining large crystalline sections (greater than a few inches in length), by reason of frequency limitations (Q values for quartz drop off at high frequencies), and where it is desired to produce elastic wave energy through a mechanism other than by piezoelectricity.

In accordance with this invention it has been discovered that temperature turnovers may result in a vast class of crystaline materials by incorporation in such materials of any of a very special class of ions. Fortunately, these ions have been under intensive study for a number of years, and their grouping is well documented. These ions are those which have been found to manifest a Jahn-Teller distortion. It is well known that this group of ions is to be considered not in a vacuum but in a specific crystalline site, so giving rise to an exclusive class of materials capable of showing the phenomenon.

Literature writings on the study of Jahn-Teller ions progress from the original work reported by H. A. Jahn and E. Teller in the Proceedings of the Royal Society of London, volume A161, page 220, 1937, and include papers by J. Dunitz and L. E. Orgel, Journal of Physics and Chemistry of Solids, volume 3, page 20, 1957; G. I. Finch, A. B. Sinha and K. P. Sinha, Proceedings of the Royal Society of London, volume A232, page 28, 1957; and A. B. Biswas, K. S. Irani, and A. B. Sinha, Journal of Physics and Chemistry of Solids, volume 23, page 711, 1962.

While, in principle, any Jahn-Teller ion, when placed in an appropriate crystallographic site, necessarily shows the temperature turnover effect, weaker interactions result in the need for greater inclusions and also in lower temperature turnover points. In general, it is found that moderate inclusions result in temperature turnovers of device capability only for Jahn-Teller ions classified as showing large distortions. Accordingly, preferred embodiments of this invention necessarily incorporate such ions. Suitable ions are $Mn^{4+}$, $V^{2+}$, $Cr^{3+}$, and $Ni^{2+}$ in a tetrahedral site, and $Mn^{3+}$, $Cr^{2+}$, and $Cu^{2+}$ in either an octahedral or tetrahedral site. Suitable crystalline materials are known to those familiar with the Jahn-Teller effect. Broadly, such materials have a cubic or trigonal crystal field and, of course, are of such nature as to accept a given Jahn-Teller ion in the required octahedral or tetrahedral site. Suitable materials include many common structures such as rock salt, zinc blende, wurtzite, rutile, silica, corundum, thallic oxide, perovskite, ilmenite, spinel, and garnet. Particularly interesting materials include magnetic and nonmagnetic compositions of the garnet structure and of the corundum structure since such materials are now available in large size and since many of them are already known to be possessed of other characteristics of interest from a device standpoint.

It has been found that the temperature at which the temperature turnover point occurs is, in turn, dependent on the magnitude of the Jahn-Teller inclusion, with such turnover increasing for increasing concentration. Based on experimental results, a series of which are described in detail herein, it has been determined that useful results may be obtained for inclusions of at least about 0.02 weight percent based on the entire composition. Turnover points at temperatures within the range over which devices are now generally operated result only upon inclusion of at least 0.1 percent by weight, and this value constitutes a preferred minimum for this reason. While inclusions are expressed in terms of entire composition, the invention depends upon partial substitutions for the cations in the structure. For this reason, total inclusion of the listed Jahn-Teller ions should not exceed fifty atom percent of the total cation content.

A detailed description of the invention is facilitated by reference to the drawings, in which:

FIG. 1, on coordinates of resonant frequency, $\gamma$, in units of megacycles per second on the ordinate and temperature in degrees Kelvin on the abscissa, is a plot showing the nature of the temperature turnover for two different levels of inclusion of a particular Jahn-Teller ion in a common system;

FIG. 2, on coordinates of temperature in degrees Kelvin on the ordinate and weight percent on the abscissa, is a plot showing the relationship between the temperature of the turnover point for Jahn-Teller concentration;

*Example 1*

A sphere of $Y_3Fe_5O_{12}$ containing $Mn^{3+}$ of the approximate diameter 100 mils was placed in the bottom of a glass tube closed at its lower extremity. The tube was surrounded with a drive coil constituting several turns of copper wire. This entire assembly was placed in a static magnetic field sufficient to magnetically saturate the sphere. A value of approximately two kilogauss was required.

An R.-F. pulse of the appropriate frequency to excite the acoustic mode (the fundamental for the 100-mil sphere—approximately one megacycle) was passed through the coil. After the passage of the R.-F. pulse, the coil was disconnected from the pulse source and was connected to suitable detection equipment. Time of the free exponential decay of the excited acoustic mode was observed to determine the Q.

Figure 1:
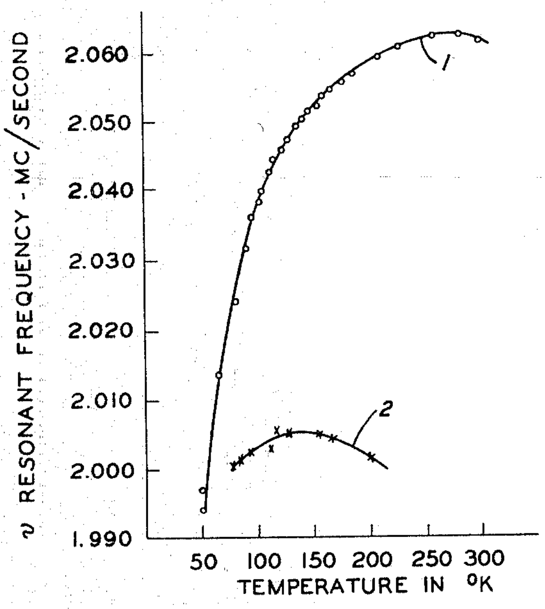
FIG. 1 is discussed in detail in conjunction with Example 1 which follows. This example describes the actual experimental work which resulted in the data plotted on that figure.

The series of steps set forth above was repeated for each of the temperatures corresponding with the data points on FIG. 1 for each of the two compositions $Y_3Fe_5O_{12}$ plus 0.35 percent by weight $Mn^{3+}$ (curve 2) and $Y_3Fe_5O_{12}$ plus 0.94 percent by weight $Mn^{3+}$ (curve 1). At each temperature it was of course necessary to determine the fundamental resonant frequency, such being determined by observing the maximum response.

Of course, the apparatus utilized in Example 1 above is suitable only in the measurement of turnover point in ferromagnetic materials. While the following example does not directly relate to any of the figures herein, it does indicate a suitable type of measurement for determining the effect in a nonmagnetic material.

*Example 2*

A 100-mill sphere of YAG, $Y_3Al_5O_{12}$, containing 0.02 percent $Mn^{3+}$ by weight based on the total composition, was loosely mounted on a shear mode piezoelectric transducer. The transducer was excited by an R.-F. pulse corresponding with the resonant frequency of the sphere. The pulse source was again disconnected and the transducer was attached to a detection means, as in Example 1. The series of measurements set forth in Example 1 was carried out, so indicating a turnover temperature point of 119 degrees Kelvin for this particular composition.

Other nonmagnetic measurements using the apparatus of Example 2 have been made on the YAG system containing such Jahn-Teller ions as $Cr^{3+}$, $Cu^{2+}$, and $Ni^{2+}$, and also in other systems such as $Al_2O_3$.

Figure 2:
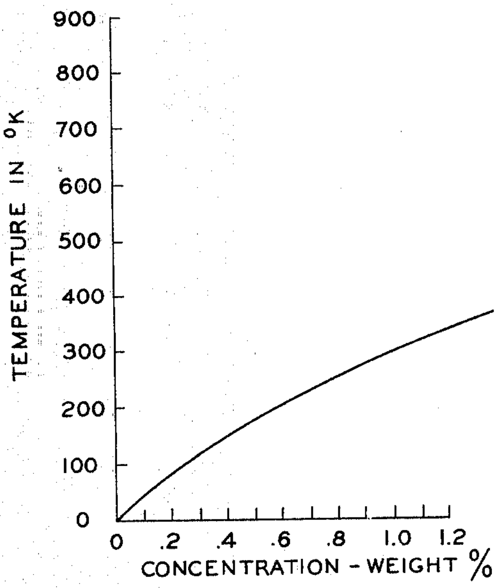

FIG. 2 is a plot of the turnover points for a series of runs conducted in the manner of those set forth in Example 1 and shows this turnover temperature as a function of the $Mn^{3+}$ inclusion in YIG.

Figure 3:
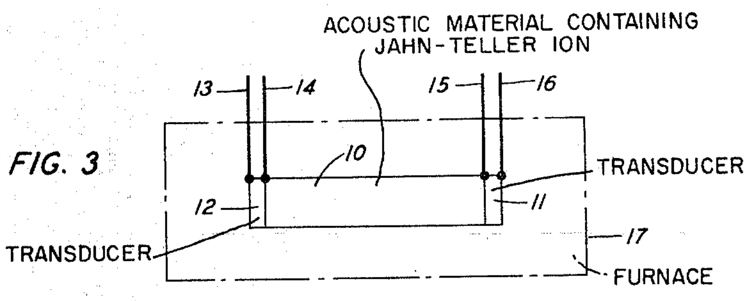
FIG. 3 is a front elevational view of a device utilizing a material herein.

FIG. 3 depicts a delay line utilizing a longitudinal member 10 of a material in accordance with the invention having affixed to its two extremities piezoelectric or other transducers 11 and 12. Electromagnetic energy, introduced for example through leads 13 and 14, produces a field across element 12, so resulting in the generation of an elastic wave which propagates down rod 10, so exciting element 11 and producing an electromagnetic signal which may be detected across leads 15 and 16. The entire assembly is maintained at a temperature approximately corresponding with the temperature turnover of the particular composition of which rod 10 is constructed by means of furnace 17. Since this particular configuration provides for transducers, the material of rod 10 is selected solely for its acoustic properties.

Figure 4:
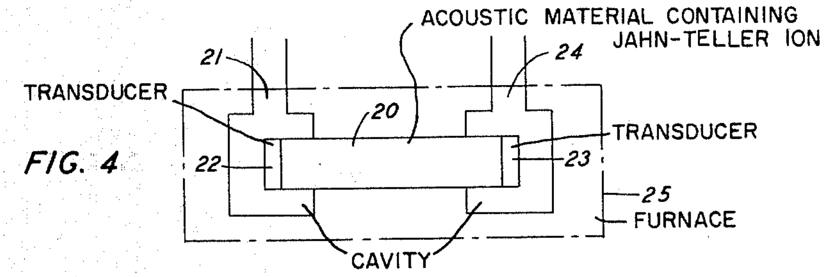
FIG. 4 is a front elevational view of another such device.

FIG. 4 depicts a delay line comprising rod 20, again constructed of an acoustic material containing a Jahn-Teller inclusion in accordance with this invention. It differs from the device of FIG. 3 mainly in that electromagnetic energy is introduced into cavity 21 and results in the production of an elastic wave by means of transducer 22 which may, for example, be a nickel film, or a magnetic material such as one of those herein. Electromagnetic energy produced by excitation of transducer element 23 is seen in cavity 24. Again, furnace 25 is provided to maintain rod 20 at a temperature approximately corresponding with this temperature turnover point.

Figure 5:
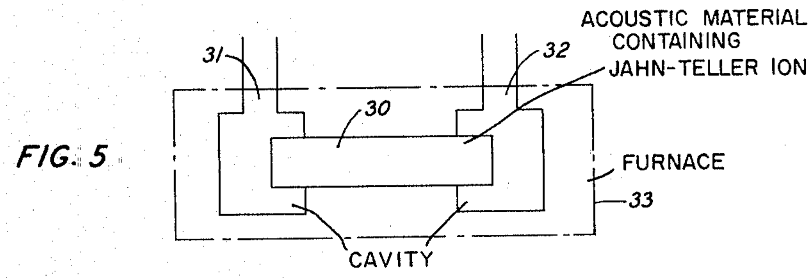
FIG. 5 is a front elevational view of yet another such device.

The device of FIG. 5, which again may operate as a delay line, is similar to that of FIG. 4 but differs in the elimination of transducers by use of a magnetic element 30 of a composition herein. A suitable example of such composition is one of those treated in Example 1. Cavities 31 and 32 complete the device, electromagnetic energy being introduced into the first and extracted from the second. An oven 33 is utilized to maintain temperature.

Figure 6A:
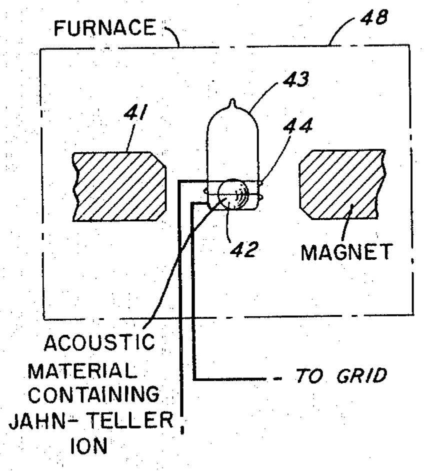
FIGS. 6A and 6B are a front elevational view and a schematic representation depicting still another device and suitable circuitry depending for its operation upon one of these compositions.
Figure 6B:
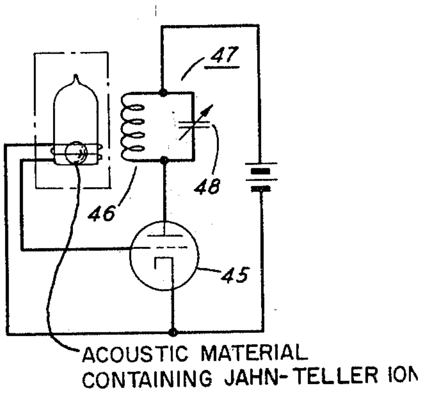

The device and circuitry of FIGS. 6A and 6B depict a tuned plate oscillator which, in this instance, includes a magnet 41, for example a permanent magnet of sufficient remanence to saturate ferromagnetic sphere 42, the latter composed of a magnetic composition in accordance with this invention. Experimentation utilizing a manganese-doped YIG sphere 42 has indicated the suitability of an Alnico magnet 41 for this purpose. Sphere 42 is contained in an evacuated sealed Pyrex tube 43, in which it is free to move and is surrounded by feedback coil 44, the ends of which are attached as indicated, one to the grid and the other to the cathode of electron tube 45. The inductive coupling between feedback coil 44 and inductance 46 of tank circuit 47 is adjusted to sustain oscillation only when sphere 42 is present and oscillating. The L–C tank circuit 47 is adjusted for the resonant frequency of the sphere by means, for example, of a variable capacitor 48. The circuit of the operating device is completed by making the L–C circuit positive and the cathode of tube 45 negative, as indicated. Sphere 42 is maintained at a temperature corresponding with its temperature turnover point by means of furnace 48. While more sophisticated relationships appear in the literature, as a first approximation the frequency of the device of FIGS. 6A and 6B in megacycles is approximately equal to 245 times the diameter of sphere 42 expressed in inches.

The invention has necessarily been discussed in a limited number of exemplary embodiments. The applicability of any of the host materials manifesting the temperature turnover point resulting from inclusion of a Jahn-Teller ion in accordance with this disclosure to any device depending for its operation on elastic wave propagation is clear. Further, the device uses here treated at length involve those precision devices which up to now have justified the increased expense of the high quality resulting only from single crystals. The temperature stability afforded by this invention, in being compositional rather than crystal configuration dependent, results in an obvious economy, making its use permissive in devices justifying only poly-crystalline materials. All such devices are considered within the scope of the invention.

What is claimed is:

1. Device comprising a crystalline material containing at least one Jahn-Teller ion manifesting a large Jahn-Teller effect, such inclusion being in the amount of at least 0.02 percent by weight based on the entire composition up to 50 atom percent based on total cation content together with means for producing an elastic wave in the said material and together with means for maintaining the said material at a temperature approximately equal to its temperature turnover point of elastic velocity.

2. Device of claim 1 in which the said inclusion is at least 0.1 percent by weight.

3. Device of claim 1 in which the said ion is selected from the group consisting of $Mn^{3+}$, $Cr^{2+}$, $Cu^{2+}$, in octahedral site and $Mn^{4+}$, $V^{2+}$, $Cr^{3+}$, $Mn^{3+}$, $Cr^{2+}$, $Ni^{2+}$, and $Cu^{2+}$ in a tetrahedral site.

4. Device of claim 3 in which the concentration of the said Jahn-Teller ion is in the amount of at least 0.1 percent by weight.

5. Device of claim 3 in which the said crystalline material of a structure selected from the group consisting of rock salt, zinc blende, wurtzite, rutile, silica, corundum, thallic oxide, perovskite, ilmenite, spinel, and granet.

6. Device of claim 1 in which the said crystalline material consists essentially of $Y_3M_5O_{12}$, in which M is at least one element selected from the group consisting of iron and aluminum additionally containing at least 0.02 weight percent of a Jahn-Teller ion showing a large effect.

7. Device of claim 6 in which the said Jahn-Teller ion is $Mn^{3+}$.

8. Device of claim 1 in which the said crystalline material is ferromagnetic, together with means for magnetically saturating said material, and in which the means producing an elastic wave in the said material is an electromagnetic alternating current field.

9. Device of claim 8 in which the said crystalline material is a single crystal shaped in the form of a sphere, and in which there is disposed about the said sphere a feedback coil connected across the grid and cathode of an electron tube, the plate of which is attached to an L–C circuit, the said circuit being inductively coupled to said feedback coil, and said current being adjusted to a resonant frequency corresponding with that of the sphere.

References Cited by the Examiner

UNITED STATES PATENTS

| | | | |
|---|---|---|---|
| 2,083,420 | 6/1937 | Atchisson | 331—158 |
| 2,938,183 | 5/1960 | Dillon | 252—62.5 |
| 3,006,856 | 10/1961 | Calhoun et al. | 252—62.5 |
| 3,038,861 | 6/1962 | Van Uitert | 252—62.5 |
| 3,068,177 | 12/1962 | Sugden | 252—62.9 |

OTHER REFERENCES

Dunitz et al.: Physics and Chemistry of Solids, vol. 3, 1957, pp. 20–29.

Irani et al.: Physics and Chemistry of Solids, vol. 23, 1962, pp. 711–727.

Finch et al.: Royal Society of London, Proceedings, Ser. A, vol. 242, 1957.

NATHAN KAUFMAN, *Primary Examiner.*

ROY LAKE, *Examiner.*

S. H. GRIMM, *Assistant Examiner.*